United States Patent
Jochem et al.

(10) Patent No.: US 7,895,769 B2
(45) Date of Patent: Mar. 1, 2011

(54) METHOD AND A PLANT FOR THERMALLY DRYING WET GROUND RAW MEAL

(75) Inventors: Matthias Jochem, Wipperfürth (DE); Klaus Kühne, Dessau (DE)

(73) Assignee: KHD Humboldt Wedag GmbH, Cologne (DE)

( * ) Notice: Subject to any disclaimer, the term of this patent is extended or adjusted under 35 U.S.C. 154(b) by 1070 days.

(21) Appl. No.: 10/558,794

(22) PCT Filed: May 13, 2004

(86) PCT No.: PCT/EP2004/005116
§ 371 (c)(1), (2), (4) Date: Sep. 26, 2006

(87) PCT Pub. No.: WO2004/103927
PCT Pub. Date: Dec. 2, 2004

(65) Prior Publication Data
US 2007/0113422 A1 May 24, 2007

(30) Foreign Application Priority Data
May 26, 2003 (DE) .................. 103 23 774

(51) Int. Cl.
*F26B 19/00* (2006.01)

(52) U.S. Cl. .............................. 34/385; 34/576; 34/379; 34/321; 34/172; 34/173; 34/86; 110/222; 110/224; 202/100; 423/210; 423/235; 209/10; 209/248

(58) Field of Classification Search .................. 34/385, 34/576, 379, 321, 172, 173, 86; 110/220, 110/224; 202/100; 423/210, 235; 209/10, 209/248
See application file for complete search history.

(56) References Cited

U.S. PATENT DOCUMENTS

| | | | | |
|---|---|---|---|---|
| 2,014,764 A * | 9/1935 | Thomas | ....................... | 34/371 |
| 2,543,885 A * | 3/1951 | Wilson | ....................... | 562/33 |
| 2,586,703 A * | 2/1952 | Odell | ....................... | 201/16 |
| 2,615,906 A * | 10/1952 | Stanton | ....................... | 556/98 |
| 2,615,907 A * | 10/1952 | Stanton | ....................... | 556/98 |
| 3,114,694 A * | 12/1963 | Bergougnou et al. | ....................... | 208/390 |
| 3,261,690 A * | 7/1966 | Wayne | ....................... | 426/417 |
| 3,323,575 A * | 6/1967 | Greenfield | ....................... | 159/13.2 |
| RE26,352 E * | 2/1968 | Greenfield | ....................... | 159/13.2 |
| 3,384,972 A * | 5/1968 | Oxley | ....................... | 34/338 |
| 3,421,902 A * | 1/1969 | Wayne | ....................... | 426/430 |
| 3,425,477 A * | 2/1969 | Farin | ....................... | 159/48.2 |
| 3,438,722 A * | 4/1969 | McKenzie et al. | ....................... | 423/210.5 |
| 3,438,727 A * | 4/1969 | Heredy | ....................... | 423/563 |
| 3,438,728 A * | 4/1969 | Grantham | ....................... | 423/563 |
| 3,438,733 A * | 4/1969 | Grantham et al. | ....................... | 423/578.4 |
| 3,519,431 A * | 7/1970 | Wayne | ....................... | 426/417 |
| 3,654,705 A | 4/1972 | Smith et al. | | |
| 3,655,331 A * | 4/1972 | Seglin et al. | ....................... | 423/207 |
| 3,692,634 A * | 9/1972 | Othmer | ....................... | 203/11 |
| 3,703,442 A * | 11/1972 | Rammler et al. | ....................... | 201/12 |
| 3,716,458 A * | 2/1973 | Greenfield et al. | ....................... | 159/13.2 |
| 3,754,074 A * | 8/1973 | Grantham | ....................... | 423/210.5 |
| 3,784,680 A * | 1/1974 | Strong et al. | ....................... | 423/571 |
| 3,793,808 A * | 2/1974 | Ackermann | ....................... | 95/197 |
| 3,854,666 A * | 12/1974 | Switzer, Jr. | ....................... | 241/18 |
| 3,891,496 A * | 6/1975 | Erwin | ....................... | 159/47.1 |
| 3,913,237 A * | 10/1975 | Gronlund et al. | ....................... | 34/373 |
| 3,920,505 A * | 11/1975 | Helleur | ....................... | 159/47.3 |
| 3,979,205 A * | 9/1976 | Wanzenberg | ....................... | 75/10.19 |
| 3,986,886 A * | 10/1976 | Sylvest | ....................... | 106/740 |
| 3,992,784 A * | 11/1976 | Verschuur et al. | ....................... | 34/385 |
| 4,017,272 A * | 4/1977 | Anwer et al. | ....................... | 48/197 R |
| 4,053,506 A * | 10/1977 | Park et al. | ....................... | 562/414 |
| 4,077,847 A * | 3/1978 | Choi et al. | ....................... | 201/21 |
| 4,079,585 A * | 3/1978 | Helleur | ....................... | 60/781 |
| 4,119,485 A * | 10/1978 | Erwin | ....................... | 159/28.3 |
| 4,153,514 A * | 5/1979 | Garrett et al. | ....................... | 201/2.5 |
| 4,170,550 A * | 10/1979 | Kamody | ....................... | 423/225 |
| 4,180,455 A * | 12/1979 | Taciuk | ....................... | 208/126 |
| 4,201,753 A * | 5/1980 | Dayen | ....................... | 423/243.03 |
| 4,203,755 A * | 5/1980 | Ruckstuhl | ....................... | 71/9 |
| 4,217,175 A * | 8/1980 | Reilly | ....................... | 202/118 |

(Continued)

FOREIGN PATENT DOCUMENTS

DE     3411147 A1 * 10/1985

(Continued)

*Primary Examiner*—Stephen M. Gravini
(74) *Attorney, Agent, or Firm*—Greer, Burns & Crain, Ltd.

(57) ABSTRACT

Raw meal sludge is dried in a vapor flow dryer by circulating exhaust vapor through a steam circuit which, prior to introduction thereof into the lower part of the dryer, is heated by indirect heat transmission from gaseous flows from a preheating system from a gas cyclone of a clinker production line. A partial vapor flow corresponding to water evaporated during raw meal sludge drying is removed from the steam circuit and extracted in the form of a condensate after increasing the vapor temperature by a vapor compressor and the passage of vapor arranged in the dryer over a heating surface of a vapor condenser. The sludge is sprayed into the lower part of the dryer where water is evaporated by the heat of the circulating exhaust vapor and heat from the condenser heating surface. Dried raw meal is separated from the exhaust vapor in a cyclone separator.

11 Claims, No Drawings

U.S. PATENT DOCUMENTS

| | | | | |
|---|---|---|---|---|
| 4,243,779 A * | 1/1981 | McAlister | | 525/462 |
| 4,244,779 A * | 1/1981 | Nieminen et al. | | 162/30.1 |
| 4,246,239 A * | 1/1981 | Dewey et al. | | 423/125 |
| 4,247,367 A * | 1/1981 | Reilly | | 202/105 |
| 4,251,227 A * | 2/1981 | Othmer | | 48/197 R |
| 4,251,236 A * | 2/1981 | Fattinger et al. | | 95/197 |
| 4,261,795 A * | 4/1981 | Reilly | | 202/118 |
| 4,285,773 A * | 8/1981 | Taciuk | | 202/100 |
| 4,295,281 A * | 10/1981 | Potter | | 34/371 |
| 4,303,415 A * | 12/1981 | Summers | | 48/202 |
| 4,304,049 A * | 12/1981 | Curtius | | 34/361 |
| 4,311,670 A * | 1/1982 | Nieminen et al. | | 422/145 |
| 4,312,646 A * | 1/1982 | Fattinger et al. | | 96/239 |
| 4,313,372 A * | 2/1982 | Gerow et al. | | 99/483 |
| 4,329,156 A * | 5/1982 | Othmer | | 44/605 |
| 4,330,946 A * | 5/1982 | Courneya | | 34/263 |
| 4,350,663 A * | 9/1982 | McAlister | | 422/137 |
| 4,351,849 A * | 9/1982 | Meade | | 426/61 |
| 4,375,402 A * | 3/1983 | Durai-Swamy | | 208/411 |
| 4,377,066 A * | 3/1983 | Dickinson | | 60/775 |
| 4,380,960 A * | 4/1983 | Dickinson | | 110/347 |
| 4,394,132 A * | 7/1983 | Taylor | | 44/280 |
| 4,414,364 A * | 11/1983 | McAlister | | 525/437 |
| 4,415,430 A * | 11/1983 | York | | 208/411 |
| 4,415,434 A * | 11/1983 | Hargreaves et al. | | 208/411 |
| 4,423,688 A * | 1/1984 | Kuo | | 110/245 |
| 4,426,936 A * | 1/1984 | Kuo | | 588/321 |
| 4,430,046 A * | 2/1984 | Cirrito | | 417/55 |
| 4,436,037 A * | 3/1984 | Kuo | | 588/321 |
| 4,450,146 A * | 5/1984 | Klepeis | | 423/304 |
| 4,465,721 A * | 8/1984 | McAlister | | 528/86 |
| 4,473,461 A * | 9/1984 | Thacker et al. | | 208/425 |
| 4,490,213 A * | 12/1984 | Anthony | | 201/17 |
| 4,523,906 A * | 6/1985 | Petrovic | | 432/167 |
| 4,530,131 A * | 7/1985 | Zell et al. | | 15/321 |
| 4,601,113 A * | 7/1986 | Draper et al. | | 34/359 |
| 4,602,438 A * | 7/1986 | Draper et al. | | 34/363 |
| 4,609,328 A * | 9/1986 | Cirrito | | 417/55 |
| 4,619,608 A * | 10/1986 | McIntyre et al. | | 423/220 |
| 4,619,732 A * | 10/1986 | Clay et al. | | 162/29 |
| 4,624,417 A * | 11/1986 | Gangi | | 241/17 |
| 4,658,891 A * | 4/1987 | Wurtz | | 165/92 |
| 4,678,860 A * | 7/1987 | Kuester | | 585/14 |
| 4,685,220 A * | 8/1987 | Meenan et al. | | 588/320 |
| 4,699,721 A * | 10/1987 | Meenan et al. | | 210/771 |
| 4,708,775 A * | 11/1987 | McGregor et al. | | 588/320 |
| 4,714,032 A * | 12/1987 | Dickinson | | 110/347 |
| 4,760,650 A * | 8/1988 | Theliander et al. | | 34/513 |
| 4,778,606 A * | 10/1988 | Meenan et al. | | 210/771 |
| 4,793,937 A * | 12/1988 | Meenan et al. | | 210/771 |
| 4,828,811 A * | 5/1989 | Derdall et al. | | 423/319 |
| 4,839,022 A * | 6/1989 | Skinner | | 208/13 |
| 4,851,722 A * | 7/1989 | Zauderer | | 310/11 |
| 4,872,954 A * | 10/1989 | Hogan | | 202/105 |
| 4,898,107 A * | 2/1990 | Dickinson | | 110/346 |
| 4,957,049 A * | 9/1990 | Strohmeyer, Jr. | | 110/234 |
| 4,970,803 A * | 11/1990 | Keller | | 34/371 |
| 4,977,839 A * | 12/1990 | Fochtman et al. | | 110/346 |
| 4,990,237 A * | 2/1991 | Heuer et al. | | 208/13 |
| 5,000,099 A * | 3/1991 | Dickinson | | 110/238 |
| 5,011,672 A * | 4/1991 | Garcia | | 423/599 |
| 5,050,375 A * | 9/1991 | Dickinson | | 60/39.12 |
| 5,056,541 A * | 10/1991 | Schade et al. | | 134/25.1 |
| 5,059,404 A * | 10/1991 | Mansour et al. | | 423/201 |
| 5,069,801 A * | 12/1991 | Girovich | | 210/770 |
| 5,093,088 A * | 3/1992 | Derdall et al. | | 422/189 |
| 5,147,429 A * | 9/1992 | Bartholomew et al. | | 55/356 |
| 5,230,167 A * | 7/1993 | Lahoda et al. | | 34/75 |
| 5,261,225 A * | 11/1993 | Dickinson | | 60/39.55 |
| 5,269,906 A * | 12/1993 | Reynolds et al. | | 208/13 |
| 5,273,629 A * | 12/1993 | Meenan et al. | | 205/688 |
| 5,291,668 A * | 3/1994 | Becker et al. | | 34/86 |
| 5,306,481 A * | 4/1994 | Mansour et al. | | 423/652 |
| 5,353,517 A * | 10/1994 | Weiss | | 34/363 |
| 5,361,514 A * | 11/1994 | Lahoda et al. | | 34/391 |
| 5,393,501 A * | 2/1995 | Clawson et al. | | 422/187 |
| 5,423,891 A * | 6/1995 | Taylor | | 48/197 R |
| 5,424,042 A * | 6/1995 | Mason et al. | | 422/159 |
| 5,426,866 A * | 6/1995 | Rumocki | | 34/321 |
| 5,455,005 A * | 10/1995 | Clawson et al. | | 422/1 |
| 5,476,990 A * | 12/1995 | Hittner et al. | | 588/314 |
| 5,485,728 A * | 1/1996 | Dickinson | | 60/648 |
| 5,518,621 A * | 5/1996 | Holcombe et al. | | 210/634 |
| 5,534,118 A * | 7/1996 | McCutchen | | 202/205 |
| 5,536,488 A * | 7/1996 | Mansour et al. | | 423/652 |
| 5,540,816 A * | 7/1996 | Andtbacka et al. | | 162/29 |
| 5,558,690 A * | 9/1996 | Hnat et al. | | 65/134.8 |
| 5,558,783 A * | 9/1996 | McGuinness | | 210/761 |
| 5,569,436 A * | 10/1996 | Lerner | | 422/170 |
| 5,585,532 A * | 12/1996 | Nagel | | 423/210.5 |
| 5,591,310 A * | 1/1997 | Olrik | | 202/160 |
| 5,591,635 A * | 1/1997 | Young et al. | | 435/286.1 |
| 5,613,452 A * | 3/1997 | Marchesi et al. | | 110/215 |
| 5,616,296 A * | 4/1997 | Hittner et al. | | 266/145 |
| 5,637,192 A * | 6/1997 | Mansour et al. | | 162/29 |
| 5,638,609 A * | 6/1997 | Chandran et al. | | 34/365 |
| 5,643,548 A * | 7/1997 | Bammer et al. | | 423/540 |
| 5,645,616 A * | 7/1997 | McIlroy et al. | | 48/202 |
| 5,649,785 A * | 7/1997 | Djerf et al. | | 405/129.27 |
| 5,656,044 A * | 8/1997 | Bishop et al. | | 48/197 R |
| 5,656,178 A * | 8/1997 | Marchesi et al. | | 210/770 |
| 5,685,153 A * | 11/1997 | Dickinson et al. | | 60/648 |
| 5,695,532 A * | 12/1997 | Johnson et al. | | 48/203 |
| 5,695,726 A * | 12/1997 | Lerner | | 423/210 |
| 5,711,018 A * | 1/1998 | Hittner et al. | | 588/314 |
| 5,762,758 A * | 6/1998 | Hoffman | | 162/190 |
| 5,765,293 A * | 6/1998 | St. Louis et al. | | 34/305 |
| 5,776,420 A * | 7/1998 | Nagel | | 422/184.1 |
| 5,792,361 A * | 8/1998 | Wang et al. | | 210/702 |
| 5,841,826 A * | 11/1998 | Rootham et al. | | 376/316 |
| 5,842,289 A * | 12/1998 | Chandran et al. | | 34/579 |
| 5,853,548 A * | 12/1998 | Piskorz et al. | | 201/7 |
| 5,928,477 A * | 7/1999 | Gammon et al. | | 203/18 |
| 5,935,885 A * | 8/1999 | Hnat et al. | | 501/1 |
| 5,976,435 A * | 11/1999 | Djerf et al. | | 264/112 |
| 6,071,380 A * | 6/2000 | Hoffman | | 162/190 |
| 6,101,739 A * | 8/2000 | Rutz et al. | | 34/373 |
| 6,117,672 A * | 9/2000 | Breckenridge | | 435/266 |
| 6,119,445 A * | 9/2000 | Bronicki et al. | | 60/772 |
| 6,120,651 A * | 9/2000 | Gammon et al. | | 203/14 |
| 6,149,765 A * | 11/2000 | Mansour et al. | | 162/29 |
| 6,169,222 B1 * | 1/2001 | Barber | | 588/314 |
| 6,202,577 B1 * | 3/2001 | Boguslavsky et al. | | 110/346 |
| 6,204,421 B1 * | 3/2001 | Genssler et al. | | 585/240 |
| 6,248,301 B1 * | 6/2001 | Hannaford et al. | | 423/22 |
| 6,256,902 B1 * | 7/2001 | Flaherty et al. | | 34/379 |
| 6,410,070 B2 * | 6/2002 | Dahlen et al. | | 426/511 |
| 6,482,373 B1 * | 11/2002 | Hannaford et al. | | 423/47 |
| 6,548,197 B1 * | 4/2003 | Chandran et al. | | 429/17 |
| 6,574,962 B1 * | 6/2003 | Hsu | | 60/649 |
| 6,579,507 B2 * | 6/2003 | Pahlman et al. | | 423/210 |
| 6,610,263 B2 * | 8/2003 | Pahlman et al. | | 423/239.1 |
| 6,682,578 B2 * | 1/2004 | Sower | | 71/11 |
| 6,688,318 B1 * | 2/2004 | Clark | | 134/107 |
| 6,736,940 B2 * | 5/2004 | Masemore et al. | | 201/25 |
| 6,777,585 B2 * | 8/2004 | Van Egmond | | 585/638 |
| 6,846,343 B2 * | 1/2005 | Sower | | 71/15 |
| 6,884,863 B2 * | 4/2005 | Van Egmond | | 526/348 |
| 6,907,845 B2 * | 6/2005 | Krebs | | 122/7 R |
| 6,974,565 B2 * | 12/2005 | Pahlman et al. | | 423/210 |
| 7,024,796 B2 * | 4/2006 | Carin et al. | | 34/363 |
| 7,024,800 B2 * | 4/2006 | Carin et al. | | 34/576 |
| 7,033,548 B2 * | 4/2006 | Pahlman et al. | | 422/170 |
| 7,097,761 B2 * | 8/2006 | Kresnyak | | 208/187 |

| | | | |
|---|---|---|---|
| 7,179,379 B2 * | 2/2007 | Appel et al. .............. 210/321.67 |
| 7,247,279 B2 * | 7/2007 | Pahlman et al. ............. 422/168 |
| 7,301,060 B2 * | 11/2007 | Appel et al. ................ 585/240 |
| 7,306,057 B2 * | 12/2007 | Strong et al. ................. 175/66 |
| 7,329,329 B2 * | 2/2008 | Masemore et al. ......... 202/117 |
| 7,338,563 B2 * | 3/2008 | Clark .......................... 134/10 |
| 7,396,514 B2 * | 7/2008 | Hammel .................... 422/168 |
| 7,476,296 B2 * | 1/2009 | Appel et al. ................ 202/118 |
| 7,487,601 B2 * | 2/2009 | Carin et al. ................... 34/381 |
| 7,494,637 B2 * | 2/2009 | Peters et al. ............... 423/439 |
| 7,533,719 B2 * | 5/2009 | Hinson et al. ............. 166/75.11 |
| 7,540,324 B2 * | 6/2009 | de Rouffignac et al. ..... 166/245 |
| 7,562,707 B2 * | 7/2009 | Miller ....................... 166/245 |
| 7,585,652 B2 * | 9/2009 | Foody et al. ............... 435/163 |
| 7,597,147 B2 * | 10/2009 | Vitek et al. ................ 166/302 |
| 7,604,052 B2 * | 10/2009 | Roes et al. ................. 166/267 |
| 7,610,692 B2 * | 11/2009 | Carin et al. ................... 34/388 |
| 7,610,962 B2 * | 11/2009 | Fowler ...................... 166/267 |
| 7,611,576 B2 * | 11/2009 | Rabiner ..................... 106/745 |
| 7,617,617 B2 * | 11/2009 | Gorbell et al. ................. 34/60 |
| 7,631,689 B2 * | 12/2009 | Vinegar et al. ............. 166/245 |
| 7,631,690 B2 * | 12/2009 | Vinegar et al. ............. 166/245 |
| 7,635,023 B2 * | 12/2009 | Goldberg et al. ........... 166/245 |
| 7,635,024 B2 * | 12/2009 | Karanikas et al. .......... 166/245 |
| 7,638,070 B2 * | 12/2009 | Johnson et al. ............. 252/373 |
| 7,644,765 B2 * | 1/2010 | Stegemeier et al. ........ 166/302 |
| 7,673,681 B2 * | 3/2010 | Vinegar et al. ........... 166/252.1 |
| 7,673,786 B2 * | 3/2010 | Menotti ..................... 228/214 |
| 7,677,310 B2 * | 3/2010 | Vinegar et al. ........... 166/272.1 |
| 7,677,314 B2 * | 3/2010 | Hsu .......................... 166/302 |
| 7,681,647 B2 * | 3/2010 | Mudunuri et al. .......... 166/302 |
| 7,683,296 B2 * | 3/2010 | Brady et al. ............... 219/553 |
| 7,685,737 B2 * | 3/2010 | Gorbell et al. ................. 34/86 |
| 7,690,201 B2 * | 4/2010 | Kravets ....................... 60/653 |
| 7,703,513 B2 * | 4/2010 | Vinegar et al. ............. 166/245 |
| 7,717,171 B2 * | 5/2010 | Stegemeier et al. ........ 166/261 |
| 7,730,945 B2 * | 6/2010 | Pieterson et al. .......... 166/272.1 |
| 7,730,946 B2 * | 6/2010 | Vinegar et al. ........... 166/272.3 |
| 7,730,947 B2 * | 6/2010 | Stegemeier et al. ...... 166/272.3 |
| 7,785,427 B2 * | 8/2010 | Maziasz et al. ............. 148/327 |
| 7,793,722 B2 * | 9/2010 | Vinegar et al. ............. 166/302 |
| 7,798,220 B2 * | 9/2010 | Vinegar et al. ........... 166/272.3 |
| 2002/0082458 A1 * | 6/2002 | Peters et al. ............... 585/242 |
| 2002/0119089 A1 * | 8/2002 | Masemore et al. ........ 423/449.7 |
| 2002/0150516 A1 * | 10/2002 | Pahlman et al. ............. 422/171 |
| 2002/0168302 A1 * | 11/2002 | Pahlman et al. ............. 422/171 |
| 2002/0179493 A1 * | 12/2002 | Etter ......................... 208/131 |
| 2003/0029604 A1 * | 2/2003 | Nagaoka et al. ............... 165/95 |
| 2003/0037922 A1 * | 2/2003 | Gibson ...................... 166/206 |
| 2003/0084693 A1 * | 5/2003 | Sower .......................... 71/11 |
| 2003/0097840 A1 * | 5/2003 | Hsu ............................ 60/670 |
| 2003/0113239 A1 * | 6/2003 | Pahlman et al. ............. 422/171 |
| 2003/0136747 A1 * | 7/2003 | Wood et al. ................ 210/774 |
| 2003/0157008 A1 * | 8/2003 | Pahlman et al. ........... 423/239.1 |
| 2003/0172697 A1 * | 9/2003 | Sower .......................... 71/11 |
| 2003/0175194 A1 * | 9/2003 | Pahlman et al. ......... 423/244.07 |
| 2004/0007500 A1 * | 1/2004 | Kresnyak ................... 208/187 |
| 2004/0102669 A1 * | 5/2004 | Van Egmond .............. 585/638 |
| 2004/0109800 A1 * | 6/2004 | Pahlman et al. ............. 423/210 |
| 2004/0134517 A1 * | 7/2004 | Clark .......................... 134/10 |
| 2004/0182000 A1 * | 9/2004 | Mansour et al. ........ 48/197 FM |
| 2004/0182001 A1 * | 9/2004 | Masemore et al. ..... 48/197 FM |
| 2004/0188340 A1 * | 9/2004 | Appel et al. .............. 210/321.68 |
| 2004/0192980 A1 * | 9/2004 | Appel et al. ................ 585/240 |
| 2004/0192981 A1 * | 9/2004 | Appel et al. ................ 585/241 |
| 2004/0232083 A1 * | 11/2004 | Van Egmond .............. 210/702 |
| 2004/0237909 A1 * | 12/2004 | Krebs ........................ 122/459 |
| 2004/0244382 A1 * | 12/2004 | Hagen et al. ................ 60/775 |
| 2005/0056313 A1 * | 3/2005 | Hagen et al. ................. 137/3 |
| 2005/0113611 A1 * | 5/2005 | Adams et al. .............. 585/240 |
| 2005/0238549 A1 * | 10/2005 | Hammel .................... 422/168 |
| 2005/0279715 A1 * | 12/2005 | Strong et al. ............... 210/774 |
| 2006/0004237 A1 * | 1/2006 | Appel et al. ................ 585/241 |
| 2006/0010712 A1 * | 1/2006 | Carin et al. ................... 34/443 |
| 2006/0010714 A1 * | 1/2006 | Carin et al. ................... 34/514 |
| 2006/0032788 A1 * | 2/2006 | Etter ......................... 208/131 |
| 2006/0101665 A1 * | 5/2006 | Carin et al. ................... 34/513 |
| 2006/0101881 A1 * | 5/2006 | Carin et al. .................... 71/21 |
| 2006/0112617 A1 * | 6/2006 | Clark et al. .................. 44/596 |
| 2006/0201024 A1 * | 9/2006 | Carin et al. ................... 34/576 |
| 2006/0254079 A1 * | 11/2006 | Gorbell et al. ................ 34/363 |
| 2006/0254080 A1 * | 11/2006 | Carin et al. ................... 34/363 |
| 2006/0254081 A1 * | 11/2006 | Carin et al. ................... 34/576 |
| 2007/0083072 A1 * | 4/2007 | Nahas ....................... 585/733 |
| 2007/0098625 A1 * | 5/2007 | Adams et al. .............. 423/484 |
| 2007/0101718 A1 * | 5/2007 | Kravets ....................... 60/645 |
| 2007/0113422 A1 * | 5/2007 | Jochem et al. ............... 34/468 |
| 2007/0251433 A1 * | 11/2007 | Rabiner ..................... 110/235 |
| 2007/0284108 A1 * | 12/2007 | Roes et al. ................. 166/302 |
| 2007/0289733 A1 * | 12/2007 | Hinson et al. ............... 166/60 |
| 2008/0017380 A1 * | 1/2008 | Vinegar et al. ............. 166/302 |
| 2008/0035346 A1 * | 2/2008 | Nair et al. .................. 166/302 |
| 2008/0035347 A1 * | 2/2008 | Brady et al. ............... 166/302 |
| 2008/0035348 A1 * | 2/2008 | Vitek et al. ................ 166/302 |
| 2008/0035705 A1 * | 2/2008 | Menotti ..................... 228/102 |
| 2008/0038144 A1 * | 2/2008 | Maziasz et al. .............. 420/45 |
| 2008/0081844 A1 * | 4/2008 | Shires et al. ............... 518/703 |
| 2008/0104858 A1 * | 5/2008 | Carin et al. ................... 34/282 |
| 2008/0105019 A1 * | 5/2008 | Carin et al. .................... 71/15 |
| 2008/0110043 A1 * | 5/2008 | Carin et al. ................... 34/487 |
| 2008/0112861 A1 * | 5/2008 | Fisk et al. ................... 422/198 |
| 2008/0128134 A1 * | 6/2008 | Mudunuri et al. .......... 166/302 |
| 2008/0135244 A1 * | 6/2008 | Miller ..................... 166/272.6 |
| 2008/0135253 A1 * | 6/2008 | Vinegar et al. ............. 166/302 |
| 2008/0135254 A1 * | 6/2008 | Vinegar et al. ............. 166/303 |
| 2008/0141672 A1 * | 6/2008 | Shah et al. ................... 60/648 |
| 2008/0142216 A1 * | 6/2008 | Vinegar et al. ............. 166/261 |
| 2008/0142217 A1 * | 6/2008 | Pieterson et al. ......... 166/272.6 |
| 2008/0146828 A1 * | 6/2008 | Benavent ................... 554/177 |
| 2008/0147241 A1 * | 6/2008 | Tsangaris et al. ........... 700/273 |
| 2008/0161428 A1 * | 7/2008 | Strait ........................ 518/702 |
| 2008/0163804 A1 * | 7/2008 | Hauk ........................ 110/224 |
| 2008/0172899 A1 * | 7/2008 | Carin et al. .................... 34/90 |
| 2008/0173442 A1 * | 7/2008 | Vinegar et al. ............. 166/245 |
| 2008/0173444 A1 * | 7/2008 | Stone et al. ............. 166/250.15 |
| 2008/0173449 A1 * | 7/2008 | Fowler .................... 166/272.1 |
| 2008/0173450 A1 * | 7/2008 | Goldberg et al. ........... 166/302 |
| 2008/0174115 A1 * | 7/2008 | Lambirth ...................... 290/2 |
| 2008/0185147 A1 * | 8/2008 | Vinegar et al. ............. 166/288 |
| 2008/0189979 A1 * | 8/2008 | Carin et al. ................... 34/576 |
| 2008/0209807 A1 * | 9/2008 | Tsangaris et al. .............. 48/89 |
| 2008/0210089 A1 * | 9/2008 | Tsangaris et al. .............. 95/90 |
| 2008/0217003 A1 * | 9/2008 | Kuhlman et al. ........... 166/245 |
| 2008/0217004 A1 * | 9/2008 | de Rouffignac et al. ..... 166/245 |
| 2008/0217015 A1 * | 9/2008 | Vinegar et al. ............. 166/302 |
| 2008/0217016 A1 * | 9/2008 | Stegemeier et al. ........ 166/303 |
| 2008/0236831 A1 * | 10/2008 | Hsu .......................... 166/302 |
| 2008/0250715 A1 * | 10/2008 | Cooper et al. .......... 48/197 FM |
| 2008/0277113 A1 * | 11/2008 | Stegemeier et al. ...... 166/272.1 |
| 2008/0283246 A1 * | 11/2008 | Karanikas et al. .......... 166/302 |
| 2008/0289385 A1 * | 11/2008 | Megy ......................... 71/33 |
| 2009/0013867 A1 * | 1/2009 | McCutchen ................... 95/35 |
| 2009/0014180 A1 * | 1/2009 | Stegemeier et al. ........ 166/302 |
| 2009/0014181 A1 * | 1/2009 | Vinegar et al. ............. 166/302 |
| 2009/0020456 A1 * | 1/2009 | Tsangaris et al. ........... 208/133 |
| 2009/0020481 A1 * | 1/2009 | Bailie et al. ................ 210/710 |
| 2009/0025285 A1 * | 1/2009 | Clark et al. .................. 44/597 |
| 2009/0032446 A1 * | 2/2009 | Wiemers et al. ............. 210/85 |
| 2009/0062581 A1 * | 3/2009 | Appel et al. ................ 585/241 |
| 2009/0071648 A1 * | 3/2009 | Hagen et al. ............. 166/272.1 |
| 2009/0071652 A1 * | 3/2009 | Vinegar ..................... 166/303 |
| 2009/0078461 A1 * | 3/2009 | Mansure et al. .............. 175/17 |
| 2009/0084547 A1 * | 4/2009 | Farmayan et al. ........ 166/272.1 |
| 2009/0090158 A1 * | 4/2009 | Davidson et al. ............. 72/369 |
| 2009/0090509 A1 * | 4/2009 | Vinegar et al. ............. 166/303 |
| 2009/0095476 A1 * | 4/2009 | Nguyen et al. ............. 166/302 |

| Publication No. | Date | Inventor | Class |
|---|---|---|---|
| 2009/0095477 A1* | 4/2009 | Nguyen et al. | 166/302 |
| 2009/0095478 A1* | 4/2009 | Karanikas et al. | 166/303 |
| 2009/0095479 A1* | 4/2009 | Karanikas et al. | 166/303 |
| 2009/0095480 A1* | 4/2009 | Vinegar et al. | 166/303 |
| 2009/0098289 A1* | 4/2009 | Deininger et al. | 427/236 |
| 2009/0107046 A1* | 4/2009 | Leininger et al. | 48/86 R |
| 2009/0114352 A1* | 5/2009 | Rossi | 162/29 |
| 2009/0119981 A1* | 5/2009 | Drozd et al. | 44/544 |
| 2009/0119990 A1* | 5/2009 | Johnson et al. | 48/61 |
| 2009/0119991 A1* | 5/2009 | Johnson et al. | 48/78 |
| 2009/0119992 A1* | 5/2009 | Johnson et al. | 48/89 |
| 2009/0119994 A1* | 5/2009 | Johnson et al. | 48/62 R |
| 2009/0120646 A1* | 5/2009 | Kim et al. | 166/302 |
| 2009/0126270 A1* | 5/2009 | Johnson et al. | 48/61 |
| 2009/0126276 A1* | 5/2009 | Johnson et al. | 48/62 R |
| 2009/0126929 A1* | 5/2009 | Vinegar | 166/263 |
| 2009/0151250 A1* | 6/2009 | Agrawal | 48/73 |
| 2009/0159461 A1* | 6/2009 | McCutchen et al. | 205/751 |
| 2009/0159523 A1* | 6/2009 | McCutchen | 210/360.1 |
| 2009/0178338 A1* | 7/2009 | Leininger et al. | 48/86 R |
| 2009/0183424 A1* | 7/2009 | Gorbell et al. | 44/505 |
| 2009/0188127 A1* | 7/2009 | Gorbell et al. | 34/388 |
| 2009/0188165 A1* | 7/2009 | Ariyapadi et al. | 48/210 |
| 2009/0189617 A1* | 7/2009 | Burns et al. | 324/649 |
| 2009/0194269 A1* | 8/2009 | Vinegar | 166/60 |
| 2009/0194282 A1* | 8/2009 | Beer et al. | 166/272.7 |
| 2009/0194286 A1* | 8/2009 | Mason | 166/302 |
| 2009/0194287 A1* | 8/2009 | Nguyen et al. | 166/302 |
| 2009/0194329 A1* | 8/2009 | Guimerans et al. | 175/17 |
| 2009/0194333 A1* | 8/2009 | MacDonald | 175/45 |
| 2009/0194524 A1* | 8/2009 | Kim | 219/544 |
| 2009/0200022 A1* | 8/2009 | Bravo et al. | 166/256 |
| 2009/0200023 A1* | 8/2009 | Costello et al. | 166/260 |
| 2009/0200025 A1* | 8/2009 | Bravo | 166/265 |
| 2009/0200031 A1* | 8/2009 | Miller et al. | 166/302 |
| 2009/0200290 A1* | 8/2009 | Cardinal et al. | 219/488 |
| 2009/0200854 A1* | 8/2009 | Vinegar | 299/5 |
| 2009/0206721 A1* | 8/2009 | Foret | 313/231.01 |
| 2009/0255144 A1* | 10/2009 | Gorbell et al. | 34/385 |
| 2009/0259076 A1* | 10/2009 | Simmons et al. | 568/671 |
| 2009/0272028 A1* | 11/2009 | Drozd et al. | 44/569 |
| 2009/0283396 A1* | 11/2009 | Bailie et al. | 202/177 |
| 2009/0286295 A1* | 11/2009 | Medoff et al. | 435/162 |
| 2009/0293359 A1* | 12/2009 | Simmons et al. | 48/127.7 |
| 2009/0294328 A1* | 12/2009 | Iqbal | 208/67 |
| 2009/0321071 A1* | 12/2009 | Zhang et al. | 166/250.01 |
| 2009/0321075 A1* | 12/2009 | Harris et al. | 166/302 |
| 2009/0321417 A1* | 12/2009 | Burns et al. | 219/542 |
| 2010/0011664 A1* | 1/2010 | Ariyapadi et al. | 48/128 |
| 2010/0051875 A1* | 3/2010 | Chornet et al. | 252/373 |
| 2010/0087687 A1* | 4/2010 | Medoff | 568/840 |
| 2010/0108567 A1* | 5/2010 | Medoff | 208/49 |
| 2010/0112242 A1* | 5/2010 | Medoff | 428/22 |
| 2010/0112378 A1* | 5/2010 | Deininger et al. | 428/702 |
| 2010/0124583 A1* | 5/2010 | Medoff | 426/2 |
| 2010/0133143 A1* | 6/2010 | Roes et al. | 208/23 |
| 2010/0139276 A1* | 6/2010 | Kravets | 60/670 |
| 2010/0160709 A1* | 6/2010 | Grierson et al. | 588/312 |
| 2010/0162625 A1* | 7/2010 | Mills | 48/76 |
| 2010/0179315 A1* | 7/2010 | Medoff | 536/123.13 |
| 2010/0181539 A1* | 7/2010 | Apanel et al. | 252/373 |
| 2010/0229725 A1* | 9/2010 | Farsad et al. | 96/74 |
| 2010/0230830 A1* | 9/2010 | Farsad et al. | 261/20 |
| 2010/0236242 A1* | 9/2010 | Farsad et al. | 60/685 |

FOREIGN PATENT DOCUMENTS

| | | |
|---|---|---|
| DE | 3904452 A1 * | 10/1990 |
| DE | 3935952 A1 * | 3/1991 |
| DE | 3935953 A1 * | 3/1991 |
| DE | 3937039 A1 * | 5/1991 |
| DE | 43 40 382 | 6/1994 |
| DE | 4436639 A1 * | 4/1996 |
| GB | 199056 | 6/1923 |
| GB | 2030469 A * | 4/1980 |
| GB | 2070967 A * | 9/1981 |
| JP | 54138893 A * | 10/1979 |
| JP | 55034243 A * | 3/1980 |
| JP | 55079834 A * | 6/1980 |
| JP | 55086501 A * | 6/1980 |
| JP | 56073523 A * | 6/1981 |
| JP | 56169105 A * | 12/1981 |
| JP | 57122922 A * | 7/1982 |
| JP | 57145024 A * | 9/1982 |
| JP | 58018013 A * | 2/1983 |
| JP | 58156327 A * | 9/1983 |
| JP | 59031214 A * | 2/1984 |
| JP | 59046155 A * | 3/1984 |
| JP | 59140291 A * | 8/1984 |
| JP | 59210992 A * | 11/1984 |
| JP | 60064118 A * | 4/1985 |
| JP | 60120111 A * | 6/1985 |
| JP | 60129118 A * | 7/1985 |
| JP | 61023687 A * | 2/1986 |
| JP | 62050839 A * | 3/1987 |
| JP | 63121624 A * | 5/1988 |
| JP | 02009728 A * | 1/1990 |
| JP | 03091203 A * | 4/1991 |
| JP | 03155101 A * | 7/1991 |
| JP | 03265687 A * | 11/1991 |
| JP | 04150984 A * | 5/1992 |
| JP | 05032524 A * | 2/1993 |
| JP | 05032526 A * | 2/1993 |
| JP | 05222422 A * | 8/1993 |
| JP | 05247867 A * | 9/1993 |
| JP | 05267015 A * | 10/1993 |
| JP | 05309229 A * | 11/1993 |
| WO | WO 2005073135 A1 * | 8/2005 |
| WO | WO 2007146992 A2 * | 12/2007 |

* cited by examiner

METHOD AND A PLANT FOR THERMALLY DRYING WET GROUND RAW MEAL

BACKGROUND OF THE INVENTION

The invention relates to a method for thermally drying wet-ground cement raw meal in the form of sludge for the purpose of manufacturing a dry meal, which is introduced into the cyclone suspension type heat exchanger system of a cement clinker production line working according to the dry method, with a dryer with utilization of the heat contained in the gaseous flows of the of the cyclone suspension type heat exchanger system and with separation of the dry meal from the exhaust vapors formed during drying.

In the so-called wet method for production of cement clinkers raw materials are wet-ground in tube mills in order to obtain in this manner a fine grained and intimately mixed raw sludge. This raw sludge is introduced in doses into a very long rotary kiln, dried there and burned into cement clinkers. It goes without saying that during drying the complete evaporation heat contributes to the loss of gaseous flows in such wet rotary kilns.

In the course of time the more favorable thermal dry method has asserted itself, in which the dry ground raw materials are burned into cement clinkers in a comparatively short rotary kiln with a serially connected cyclone suspension type heat exchanger system.

In the conversion of existing wet plants into modern dry plants it is known to retain the wet preparation of the raw material and to convert the raw material in the form of sludge, i.e. the raw meal sludge by means of a mechanical and subsequently thermal dehydration in the degree of dryness required for loading into the cyclone suspension type heat exchanger. For example, it is known from DE-A-43 40 382 to mechanically dehydrate a raw meal sludge in a filter press, to thermally dry the filter cake in a dryer system with utilization of the heat of the cement clinker production to calcine it in a calcining step and to burn it into cement clinkers in a rotary kiln, said clinkers being cooled in a clinker cooler. The dryer system used in the process is a so-called flow dryer, comprising an impact hammer crusher permeated by hot gas, a riser, a separator with recirculation of coarse grain to the impact hammer crusher and a separator e.g. filter for separation of the dried raw meal from the drying gas.

Disadvantageous in this known production of cement clinkers is the driven technical expenditure for the mechanical dehydration and drying of the filter cake, in particular the use of the impact hammer crusher or drying crusher with rotating machine parts. For example the impact hammer crusher of the known flow dryer must be dimensioned in its size and performance in such a way that the hammers can also be passed through the still damp material on the impact hammer crusher bottom in the case of an insufficient rate of drying. In addition to this comes the comparatively high wear of the impact hammer crusher or rotary dryer caused by the parts rotating at a high speed. In the case of the known flow dryer system it cannot be avoided that the greater part of the water vapor heat content is to be added to the loss of gaseous flows. For this reason the conversion of an existing wet system for the production of cement clinkers to a dry method can be uneconomical, if one considers the fact that the specific heat energy requirement of such a converted cement clinker production line still amounts to approximately 900 kcal/kg clinkers.

A fluid bed dryer using vapor for the drying of a clear sludge containing 96% water is known from U.S. Pat. No. 3,654,705. However, a fluid bed dryer cannot be operated with such fine grained solids of a fineness such as cement raw meal must exhibit, namely a fineness of 85%<90 μm, which corresponds to normal cement raw meal fineness.

SUMMARY OF THE INVENTION

The invention is based on the object of reducing equipment for dehydrating and drying sludge for producing cement clinker from wet-ground cement raw meal in the form of sludge, in particular during transformation of existent sludge dewatering equipment into sludge drying equipment and, above all during thermal drying sludge in order to maintain the heat loss associated with the formation of exhaust vapors as low as possible.

In the case of the method of the invention the thermal drying of the cement raw meal sludge takes place in a vapor flow dryer, into whose lower part the pumpable raw meal sludge is directly sprayed. Machines for mechanical dehydration of the raw meal sludge such as e.g. centrifuges; filter presses etc. are no longer needed. Below the region of the raw sludge spraying an exhaust vapor flow is introduced into the vapor flow dryer, said exhaust vapor flow being extracted from the dryer above and after separation of the dried meal being re-circulated in the dryer as an exhaust vapor recirculation flow. Prior to its introduction into the low part of the dryer the recirculated exhaust vapor flow is heated by indirect heat transmission from gaseous flows of a pre-heating system by suspending in a gas cyclone of a clinker production line.

A partial vapor flow corresponding to water evaporated during raw meal sludge drying is removed from the steam circuit and extracted in the form of a condensate after increasing the vapor temperature by a vapor compressor and the passage of vapor arranged in the dryer through the heating surface of a vapor condenser, whereby the extracted vapor condensate flow can still pre-heat the cement raw meal sludge to be sprayed in the dryer by means of indirect heat transmission.

The main advantage of the inventive method lies in the nearly complete recovery of the water vapor heat content of the dryer exhaust vapors, as a result of which the specific heat energy requirements of a cement clinker production line converted in accordance with the invention approach the specific heat energy requirements of a cement clinker production line of approximately 720 kcal/kg clinkers working according to the dry method.

BRIEF DESCRIPTION OF THE DRAWINGS

The invention and its additional features and advantages will be described in greater detail with the help of the embodiment schematically represented in the drawing.

The FIGURE is a schematic illustration of a plant for thermally drying wet-ground raw meal with flow arrows showing the method involved.

DETAILED DESCRIPTION OF THE DRAWINGS

The drawing schematically shows the inventive method of the corresponding plant for thermally drying a cement raw meal sludge 11 coming from wet-grinding 10, the sludge with a water content of about 35% being introduced into a sludge tank 12, from which the sludge is sprayed by means of the pump 13 and the nozzle device 14 into the lower part of a thermal dryer 15, the dryer being constructed as a climbing shaft vapor flow dryer passing from bottom to top. The vapor flow dryer 15 includes a discharge aperture 16 on its top side, which is connected to a cyclone separator 17 for separation of the dry meal 18 from an exhaust vapor flow 19 issuing from water evaporation in the dryer, the exhaust vapor flow 19 being introduced at a temperature of approximately 120° C. via an exhaust vapor recirculation pipe 20 with an exhaust vapor recirculation blower 21 to the lower part of the vapor flow dryer 15 below the sludge spray nozzles 14.

In the exhaust vapor recirculation pipe 20 an indirect heat exchanger 24 operated with gaseous flows 23 from the cyclone suspension type heat exchanger system of a cement clinker production line is arranged between the exhaust vapor recirculation blower 21 and the pipe entrance 22 in the dryer 15, the indirect heat exchanger 24 heats up the recirculated exhaust vapor flow prior to introduction into the dryer 15 from approximately 120° C. to approximately 270° C., whereby the gaseous flows 23 of the cyclone suspension type heat exchanger system in the heat exchanger 24 cool down from approximately 350° C. to approximately 200° C.

At the delivery side of the exhaust vapor recirculation blower 21 an exhaust vapor branch line 25 of the exhaust vapor recirculation pipe branches off, the exhaust vapor branch line 25 being connected to the vapor inlet of a heating surface 27 of the vapor condenser arranged within the vapor flow dryer 15 via a vapor compressor 26, the heating surface 27 of the vapor condenser whose condensate outlet 28 is connected to a steam trap 29. Via the vapor branch line 25 a partial vapor flow which corresponds to the water evaporated during raw meal sludge drying is removed from the steam circuit 16, 19, 20, 22 and extracted in the form of a condensate after increasing the vapor temperature by a vapor compressor 26 and the passage through the heating surface 27 of the vapor condenser.

Prior to its being sprayed 14 into the dryer, the raw meal sludge pumped into the vapor flow dryer 15 is preheated to approximately 70° C. in the indirect heat exchanger 30 by the vapor condensate flow 28 which is 120 to 160° C. hot. The sprayed drops are caught by the rising steam (vapor) circulation flow from the pipe entrance 22, very quickly heated up to saturation temperature (100° C.) and carried along to the top. In the heating surface 27 of the vapor condenser the complete evaporation of the water content then takes place by means of heat exchange of the heating surface which is approximately 20 to 60° C. hotter.

The discharge of the vapor compressor 26 is regulated in such a way that no excess pressure builds up in the vapor flow dryer 15. For this purpose the drive motor 31 of the vapor compressor 26 is connected to a pressure regulator 32 in active connection to the dryer 15. The pressure of the vapors amounts on the induction side of the vapor compressor 26 to approximately 1 bar and on the delivery side to approximately 2 to 6 bar, which corresponds to the aforementioned vapor condenser temperature of approximately 120 to 160° C.

For the purpose of starting the inventive drying device and for safety reasons the system is also equipped with a starting air vent 33 and with a safety valve 34. In any event the raw meal 18 to be fed to the cyclone suspension type heat exchanger system of a cement clinker production line has a water content <1% and the required raw meal fineness of approximately 85%<90 μm.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The invention claimed is:

1. A method for thermally drying wet-ground cement raw meal in the form of a pumpable sludge, which sludge is introduced into a cyclone suspension type heat exchanger system of a cement clinker production line working according to the dry method, with a dryer, with utilization of heat contained in gaseous flows of the cyclone suspension type heat exchanger system and with separation of dried meal from exhaust vapors formed during drying, comprising the steps:
   a) introducing the pumpable raw meal sludge, as well as an exhaust vapor flow being re-circulated in the dryer as an exhaust vapor recirculation flow in a steam circuit, in a lower part of the dryer constructed as a vapor flow dryer,
   b) heating the recirculated exhaust vapor flow prior to its introduction into the lower part of the dryer by indirect heat transmission from gaseous flows from the cyclone suspension type heat exchanger system,
   c) removing a partial vapor flow, which corresponds to water evaporated during raw meal sludge drying, from the steam circuit, by extraction in the form of a condensate, after first increasing the vapor temperature of the partial vapor flow with a vapor compressor and then by passing vapor from the vapor recirculation flow in the dryer over a heating surface of a vapor condenser.

2. The method according to claim 1, wherein the step of introducing the pumpable raw meal sludge is accomplished by spraying the sludge into the dryer.

3. The method according to claim 1, wherein the exhaust vapor flow is extracted from the dryer for recirculation above and after separation of the dried meal from the vapor recirculation flow.

4. The method according to claim 1, wherein, prior to its being introduced into the dryer, the raw meal sludge pumped into the vapor flow dryer is preheated by means of indirect heat transmission from a flow of the extracted vapor condensate.

5. The method according to claim 1, wherein a discharge of the vapor compressor is regulated in such a way that no excess pressure builds up in the vapor flow dryer.

6. The method according to claim 5, including the steps of measuring a pressure in the vapor flow dryer and regulating a temperature or volume of the partial vapor flow through the vapor compressor and to the heating surface of the vapor condenser.

7. The method according to claim 1, wherein the pumpable raw meal sludge is introduced to the dryer by spraying.

8. A plant for thermally drying wet-ground cement raw meal in the form of sludge for the purpose of manufacturing a dry meal, with a dryer utilizing heat contained in gaseous flows from a cyclone suspension type heat exchanger system and with separation of the dry meal from exhaust vapors formed during drying, comprising:

the dryer being constructed as a rising shaft vapor flow dryer having a lower region with a spray inlet for the raw meal sludge and an exhaust vapor recirculation inlet, and an upper region with a discharge aperture which is connected to a cyclone separator for separation of dry meal from an exhaust vapor flow, an exhaust vapor recirculation pipe with an exhaust vapor recirculation blower therein connected between an exhaust vapor flow outlet of the cyclone separator and the exhaust vapor recirculation inlet at the lower part of the dryer, an indirect heat exchanger arranged to receive gaseous flows from the cyclone suspension type heat exchanger system of a cement clinker production line and the exhaust vapor flow from the exhaust vapor recirculation blower, and an exhaust vapor branch line of the exhaust vapor recirculation pipe branching off from a delivery side of the exhaust vapor recirculation blower, the exhaust vapor branch line being connected via a vapor compressor to a vapor inlet of a heating surface of a vapor condenser arranged within the vapor flow dryer, the heating surface of the vapor condenser having a condensate outlet connected to a steam trap.

9. The plant according to claim 8, further including a pressure regulator connected to the vapor flow dryer and to a drive motor of the compressor to regulated the pressure in the vapor flow dryer.

10. The plant according to claim 8, further including a pump for pumping the sludge to the spray inlet.

11. The plant according to claim 8, further including an indirect heat exchanger arranged to receive condensate between the condensate outlet of the heating surface of the vapor condenser and the steam trap, and to receive sludge from the pump prior to the spray inlet.

* * * * *